United States Patent

[11] 3,627,991

[72] Inventors Horace A. Beall
Santa Ana;
Visvaldis A. Vitols, Orange, both of Calif.
[21] Appl. No. 13,554
[22] Filed Feb. 24, 1970
[45] Patented Dec. 14, 1971
[73] Assignee North American Rockwell Corporation

[54] PATTERN READER
17 Claims, 12 Drawing Figs.

[52] U.S. Cl. .... 235/61.11 E, 235/61.7 B, 250/219 CR, 340/146.3 F, 350/160 R, 356/71
[51] Int. Cl. .... G06k 7/14
[50] Field of Search .... 235/61.11 E, 61.7 B; 340/146.3 E, 149, 146.3 F; 356/71, 36, 109, 120, 136, 108; 350/112, 160, 161, 166; 250/219 DC, 219 DQ, 216, 219 CR; 194/4; 200/46

[56] References Cited

UNITED STATES PATENTS

| | | | |
|---|---|---|---|
| 3,174,414 | 3/1965 | Myer | 356/71 X |
| 3,527,535 | 9/1970 | Monroe | 356/71 |
| 3,395,963 | 8/1968 | Ackerman | 235/61.11 E |

OTHER REFERENCES

Wendelandt et al., Reflectance Spectroscopy, 1966, pp. 180- 181, copy in Scientific Lib.

*Primary Examiner*—Daryl W. Cook
*Assistant Examiner*—Leo H. Boudreau
*Attorneys*—L. Lee Humphries, Frederick H. Hamann, Edward Dugas and Gausewitz and Carr

ABSTRACT: Embossed characters of a conventional credit card are read by an electrooptical arrangement that converts the characters into electrical signals. A transparent cylindrical disc is illuminated by a light beam that impinges upon a portion of its internal annular surface at an angle greater than the critical angle of the disc body to provide total internal reflection. A thin strip of flexible resilient film is positioned closely adjacent to but normally out of optical contact with the exterior of the annular disc surface. A card having at least a line of raised characters printed thereon is fed along a surface tangential to the disc so as to be pressed by a drive roller against the disc with the resilient film interposed between the disc and card. The raised pattern of characters on the card selectively presses the thin film into optical contact with the exterior annular surface of the disc thereby selectively frustrating the total internal reflection of light in a pattern determined by the raised pattern of card characters. The resilient film is fed to the periphery of the disc together with the feeding of the card to be read so that as the disc rotates and the card advances, successively different portions of the film are interposed between the card and the disc. Reflected light is received by an array of photocells that scan the reflected image of each character a number of times to provide an output electrical signal.

INVENTORS.
HORACE A. BEALL
VISVALDIS A. VITOLS
BY
Gausewitz & Carr
ATTORNEYS.

INVENTORS.
HORACE A. BEALL
VISVALDIS A. VITOLS
BY
Jaraewitz & Carr
ATTORNEYS.

INVENTORS.
HORACE A. BEALL
VISVALDIS A. VITOLS
BY
Gausewitz & Carr
ATTORNEYS.

INVENTORS.
HORACE A. BEALL
VISVALDIS A. VITOLS
BY
Gausewitz & Carr
ATTORNEYS.

INVENTORS.
HORACE A. BEALL
VISVALDIS A. VITOLS
BY
Gausewitz & Carr
ATTORNEYS.

INVENTORS.
HORACE A. BEALL
VISVALDIS A. VITOLS
BY Gausewitz & Carr
ATTORNEYS.

PATTERN READER

BACKGROUND OF THE INVENTION

1. Field of the Invention

The present invention relates to the field of information transfer and handling, and particularly concerns apparatus and methods for impressing information upon a beam of energy. In a specific application the invention is embodied in an optical pattern reader that provides apparatus for rapidly retrieving information topologically encoded upon flat or nearly flat materials.

2. Description of Prior Art

With the recent and continuing explosive increase of information, it becomes ever more important to process, store and retrieve information mechanically, rapidly and accurately. Significant success and progress has been achieved in the handling and processing of information in a variety of business and scientific computing machines. These machines have almost unlimited storage capacities and will perform exceedingly complex operations and calculations upon vast quantities of information in time intervals that are measured in microseconds and less. Nevertheless, capability of the most sophisticated and complex of these computing machines is severely limited by input and output equipment. Accordingly, extensive efforts are directed toward design and development of improved concepts of mechanization of such input equipment. This presently involves a variety of pattern recognition devices employing magnetic sensing, optical sensing and punched tape or cards.

Mechanical reading of printed bank checks is an extensive and well-developed area of computer input equipment. In commonly used bank check systems, all checks issued on or to be used in connection with a particular account have printed on one edge a coded number corresponding to that account. Most commonly, the coded number is printed in magnetic ink so that there will be no confusion with other notations in nonmagnetic ink that may extend into the code area when a check is made out or otherwise handled. In the processing of such checks, they are run through a scanner which scans the magnetic code, sorts the checks into different accounts or otherwise retrieves information concerning the particular account upon which the check is drawn. Such an arrangement accomplishes with regard to such checks a major objective of the system, which is to increase the speed of scanning of the information recorded on the check, thus avoiding human error and overcoming the input equipment limitation on the data-processing computer. Such arrangements have been found to be satisfactory but, of course, the bank that issues the checks must first encode the specific information in a particular format with the magnetic ink, whereby the reading apparatus is limited to the reading of the particular type of pattern. Furthermore, magnetic patterns may be magnetically erasable and may be difficult for a human to read because of the required use of unique fonts. For these reasons, among others, such a system—the magnetic reading of magnetically printed patterns—could not be employed with any devices such as the ubiquitous credit card that is used in ever-increasing numbers.

The identification cards, commonly termed credit cards, are employed for a variety of purposes other than simply for credit purchases. Hospitals and a number of other organizations are beginning to more widely employ credit card type identification for members. Certain states have adopted such cards for drivers' licenses and some may even be used to pay taxes. All such uses require at least a visual reading of the card number and most employ computer processing of the information borne on the card. Among the most common application of the credit card is its use for credit purchase at the actual location of the sale. In such situation, any credit purchase that is in an amount greater than a particular limit that is specified by the organization issuing the credit must be authorized by a credit data center. Presently, the clerk will employ the credit card to make an optically or color contrasted printout of information on the card as by imprinting upon the conventional sales slip and then visually read name, address, or specific identification number either from such printout or from the card itself. To obtain authorization for the credit sale, the clerk will then communicate by telephone with a credit data center or send the credit card number to the center by operation of a touch-tone telephone keyboard. This method is time consuming, expensive in telephone line costs, subject to high error rates and can be improperly manipulated by dishonest merchants. Accordingly, it is highly desirable to provide a mechanical or automatic device that will eliminate all of these problems that are due to the necessity for reading of credit card identification by the human operator.

A variety of attempts to achieve improved optical reading have encountered different degrees of success but none are available for suitable reading of the embossed pattern of the large majority of credit cards that are presently in use. Optical pattern-reading systems such as shown, for example, in U.S. Pat. No. 3,250,172 to T. C. Abbott, Jr., et al., in U.S. Pat. No. 3,258,581 to D. N. Buel, and in U.S. Pat. No. 3,265,518 to D. J. Lasky, all employ techniques involving varying reflection of light from patterns of light and dark areas. Dependence on such color contrast is emphasized in the patent to Lasky who suggests a method for enhancing optical contrast provided by ink dyes, by use of a method of chemical treatment to further dissolve previously undissolved dye particles. Nevertheless it will be appreciated that the light/dark contrast available in some embossed patterns such as the common credit card, for example, may either be totally lacking, since some cards use no color differential, or may be subject to disabling errors due to dirt and smudges, inadequate light intensity, or wear or abrasion of the dye.

Systems for viewing and identifying fingerprints by employing frustrated total internal reflection are shown in U.S. Pat. No. 3,383,657 to C. H. Claassen, et al., in U.S. Pat. No. 3,282,152 to J. H. Myer and U.S. Pat. No. 3,407,715 to McCutchen. These arrangements require direct contact of a finger with the surface at which the total internal reflection occurs and, accordingly, could not be used for reading of relatively rigid topological surface features such as the embossed characters of the common credit card. In fact, the patentee Myer suggests the use of an oily substance such as lanolin or glycerin on the fingers to enhance the coupling action of the fingers to the optical element. Such individual application of oils is difficult, time consuming, undesirable, and nevertheless, will still fail to provide adequate optical contact of the hard material of the conventional credit card without use of excess pressure. These fingerprint readers are useful for recognizing a pattern of ridges on soft, resilient skin tissue. The relatively hard, rigid, plastic material of which conventional credit cards are made cannot make sufficient optical contact with the described prismatic surfaces without application of pressure of such magnitude as would seriously damage the embossed card pattern.

Various light modulation systems are shown in U.S. Pat. Nos. 2,565,514 to Pajes, 3,360,324 to Hora, 3,338,656 to Astheimer, 3,443,098 to Lewis, and 3,376,092 to Kushner, et al. These patents utilize various arrangements such as other optical surfaces or as in the patent to Lewis, a flat sheet of pliable dielectric, which are coextensive with the surface that is arranged for total internal reflection. In these patents, modulation of the light beam is achieved by moving an external body as a unit over the total area of the reflecting surface so as to achieve a full and complete modulation over the entire area of the reflected beam. A variety of complex mechanical and electromechanical, piezoelectric, and electrostatic arrangements are employed to vary the wavelength distance of the external material adjacent the total internal reflecting surface. The patent to Kushner, et al., relates to a solid-state display that is achieved by employing a matrix or mosaic of elements that may be selectively operated to frustrate total internal reflection in a specific pattern that is to be displayed. The reflection-frustrating mosaics of Kushner, et al., are comprised of magnetostrictive or piezoelectric elements that are actuated solely by a group of desired externally generated electrical signals. No suggestion is found in any of these patents relating to employing frustration of total internal reflection for reading since each is concerned with the control of reflection in response to electrical or acoustical signals. Arrangements to be described below employ some of these techniques of total internal reflection to achieve a totally new result of reading and transducing a topological pattern.

Accordingly, it is an object of the present invention to provide an optical reader that does not depend upon light/dark color contrasts of a pattern being read. Another object of this invention is the reading of a topological surface pattern by means of frustrated total internal reflection.

SUMMARY OF THE INVENTION

In carrying out the principles of the present invention in accordance with a preferred embodiment thereof, an energy beam is modulated by causing it to impinge upon a surface of a body at an angle greater than the critical angle of the body and the surface is selectively contacted in a pattern of media having mutually different indices of refraction. Preferably, one medium is air and the other a film that is caused to be impressed upon the surface of a body in the pattern that is to be recognized. Where the film has an index of refraction significantly higher than the index of refraction of the fluid, total internal reflection of energy from the surface is frustrated in the pattern of contact between the surface and the film whereby, when light energy is employed, an optically sensitive apparatus may receive light that varies in intensity in conformity to the pattern to be recognized. More specifically, in accordance with an embodiment of the invention, a topological surface pattern is read by impinging a light beam through a transparent body for reflection from a surface thereof at an angle greater than the critical angle of the body, selectively impressing a thin film against the surface by pressing upon said film the topological pattern that is to be read, and thence collecting the modulated light reflected from the surface.

DETAILED DESCRIPTION

Figure 1:
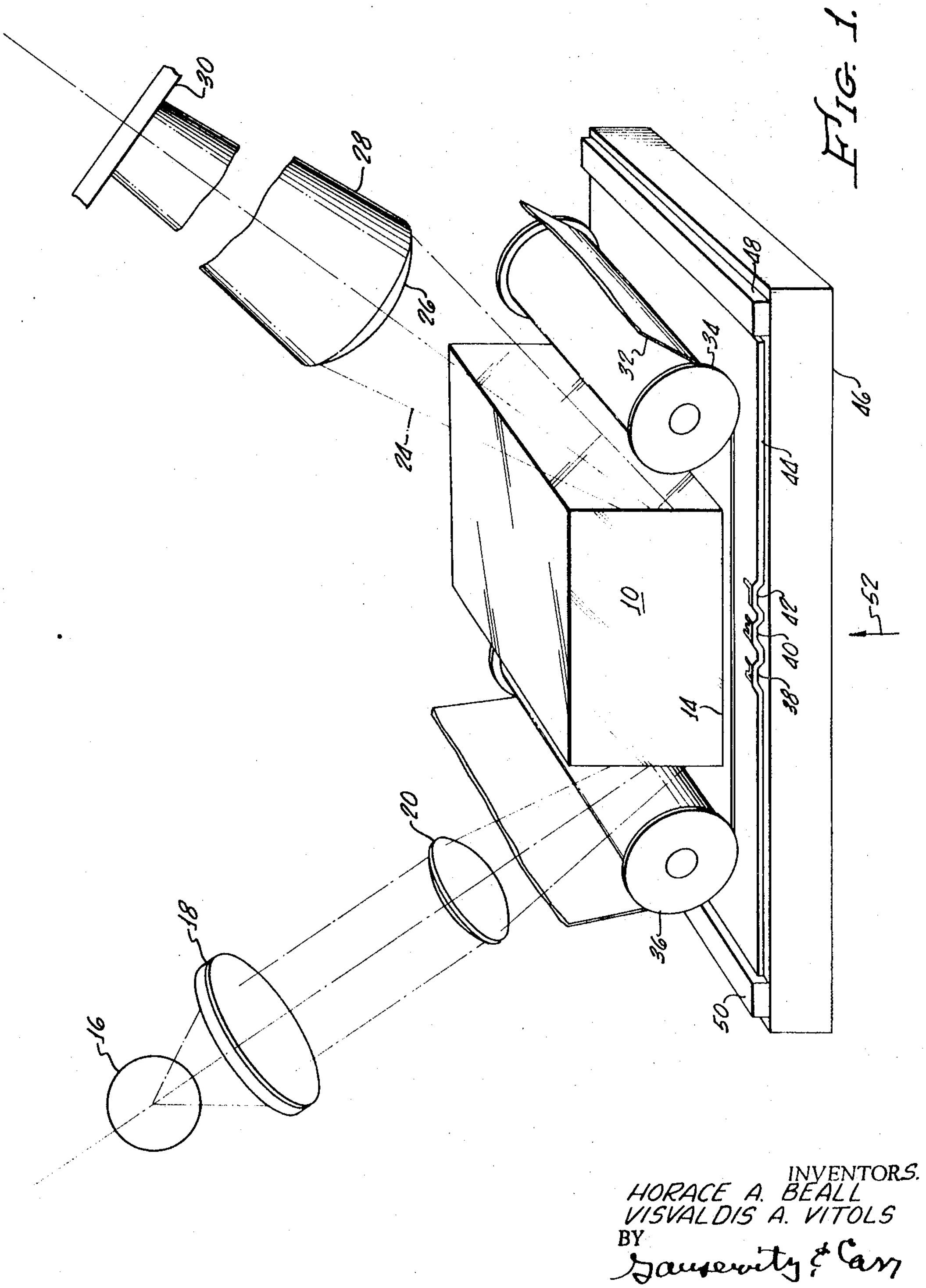
FIG. 1 is a pictorial illustration of elements and operation of a device embodying principles of the present invention, FIGS. 2 through 5 comprise different views of a preferred embodiment of the invention.

A simplified embodiment of the invention is illustrated in FIG. 1 and will be employed to explain principles of operation. A solid optically transparent body such as a glass or plastic slab 10 has a reflecting surface 14 that is evenly illuminated by light from a lamp 16 that passes through a diffusing plate 18 and is substantially uniformly projected by a lens system 20 upon the surface 14. The apparatus is arranged so that at least a significant portion of light impinging upon the surface 14 will be totally internally reflected by the interface where the glass body 10 is in contact with the surrounding fluid, air. After total internal reflection from the glass/air interface at surface 14, the light traverses the path indicated by dotted line 24 to a lens 26 which focuses the reflected light along a path 28 upon an optically sensitive surface 30 which may be any one of a number of well-known light-sensitive devices such as a photocell array to be more particularly described hereinafter.

As is well known, for total internal reflection the optical energy must impinge on the surface 14 at an angle with respect to a normal to the surface that is greater than the critical angle for the material of which the body 10 is fabricated. This angle is defined by the equation $\alpha = \sin^{-1} 1/N$ where $N$ is the index of refraction of the transparent material of the body 10. For an index of refraction $N$=1.5, which is typical for many glasses and transparent plastics, the critical angle is 41°50′. Reflection of the light beam from the glass/air interface at surface 14 occurs because of the large difference between the index of refraction of the material of body 10 and the index of refraction of the medium that optically contacts the surface 14 externally of the body. If the ambient air is replaced either partly or entirely by a material in contact with the exterior of surface 14, which material has an index of refraction significantly higher than the index of refraction of air, the total internal reflection is frustrated wherever there is no longer a sharp change in index of refraction. Normally there is a continuous glass/air interface at surface 14 and total internal reflection of light provides a beam traversing paths 24 and 28 of relatively high intensity. Energy received by the photosensitive device or surface 30 is relatively high and substantially uniform.

In accordance with the present invention this high intensity of reflected light is selectively diminished, in a pattern to be read, by frustrating total internal reflection in such pattern.

To facilitate selective modification of the index of refraction of medium that is in contact with the glass body 10 at the surface 14, and thereby modulate the reflected beam, there is provided a thin resilient film or membrane 32 that is carried by rollers (not shown), entrained over rollers 34, 36, and positioned in close proximity to but out of optical contact (as described below) with the exterior surface 14 of the optical body 10. The membrane 32 is a film of suitable plastic such as polyethylene or vinyl of from 5 to 20 mils in thickness and having sufficient pliability and elasticity so as to be capable of being impressed upon and forced into optical contact with the exterior of surface 14 in a well-defined pattern of relatively narrow lines or convolutions. If film 32 is forced into optical contact with the surface 14, the total internal reflection only at those portions of the surface 14 that are in optical contact with the film 32 is frustrated and the intensity of reflected light is greatly diminished in a pattern. Thus, when the index of refraction of medium in contact with the surface 14 is significantly increased in a selected pattern, as by selectively displacing portions of the membrane 32 into optical contact with the surface 14, the intensity of light reflected along the path is significantly decreased in a pattern that closely conforms to the pattern over which the air previously in contact with surface 14 has been displaced by deformed portions of the thin film 32. In effect, the index of refraction of medium in contact with the surface 14 has been selectively changed in a pattern that is embodied in or modulated upon the reflected light beam.

The optical contact required for frustration of the total internal reflection is a spacing, at the interface between two media of different indices of refraction, that is in the order of less than a few wavelengths of the light. As the distance between the two media at the interface decreases from a magnitude, such as several wavelengths, at which total internal reflection occurs, a point is reached at which some light is transmitted across the interface and reflection is no longer total. This change in relative proportions of reflected and transmitted light undergoes a rapid increase as the distance decreases to and below a distance in the order of a wavelength. This latter situation may be termed optical contact, occurring when the spacing is sufficiently small so that a significant proportion of light reaching the interface is transmitted even though it impinges at an angle greater than the critical angle and internal reflection is considerably decreased. Thus it will be understood that the film 32, even though it is tensioned and thereby held in physical contact with the surface 14, will not be in optical contact therewith, possibly because of an entrapped layer of air and/or surface roughness of the film. Nevertheless, pressure of an embossed pattern, exerted substantially normal to the film, will effect the selected pattern of optical contact that modulates the total internal reflection.

In order to deform the film 32 into a pattern of selective optical contact with the surface 14, the desired pattern is carried by topological features such as ridges 38, 40, and 42 of a substantially rigid sheet or card 44, such as a conventional credit card. In the illustrated arrangement the card 44 is temporarily positioned upon an upwardly movable table 46 and located by suitable means, such as stops 48, 50, whereby when the table 46 is moved upwardly as indicated in FIG. 1 by the arrow 52, the ridges 38, 40 and 42 bear upon the film 32 deforming the latter in accordance with the pattern embossed upon the sheet 44. The thin film thus is elastically deformed upwardly and selectively into optical contact with the exterior of surface 14 in a pattern conforming to the pattern embossed upon the card. In this manner, the rigid embossed pattern of the card 44 is protected against excessive pressure which otherwise would be required to enable adequate optical contact of ridges 38, 40 and 42 with the surface 14. Further, the card requires no preparation or treatment for the reading operation. The optical contact is accomplished by the relatively resilient film 32 which is interposed between the embossed pattern and the reflective surface. Upon lowering of table 46 to withdraw the embossed card from its pressure-exerting contact upon the film, the latter, because of its inherent resilience, returns to the illustrated position thereof in close contact to but out of optical contact with the surface 14. Resolution and definition of the pattern of frustrated total reflection is at least in part dependent upon thickness and elasticity of the membrane 32. The latter is sufficiently thin and elastic so that all portions thereof that are not subjected to the peak pressure of the ridges 38, 40 and 42 will remain out of optical contact with the surface 14 even though the embossed pattern may be extensive covering a significantly large portion of the film 32. This selective, well-defined pattern of optical contact between the film and the surface 14 is enhanced not only by flexibility and elasticity of the film but by application of suitable tension to the film, that may be applied by means of the film-mounting apparatus.

The stops 48, 50 may be adjusted so as to position a line of embossed characters corresponding to ridges 38, 40, 42 substantially centrally of the glass body 10. The glass body may have sufficient extent in a direction normal to the plane of the paper to cover the entire length of the line of printing or the length of a full conventional credit card. To simplify the electronics of the photosensitive readout the body preferably has a width slightly greater than the height of one or more lines of characters to be read. However, for convenient display of the embossed characters on the entire card or sheet 44, the slab 10 may be coextensive therewith, so that several or all lines of printing may be projected for visual readout or scanning by more complex electrooptical arrangements. Any one of a number of well-known mechanical arrangements may be employed to achieve the desired vertical motion of the table 46 or to otherwise press the credit card against the film for optical contact with the surface 14. In order to prevent wear upon the membrane 32 and to provide a fresh portion of the membrane for each of a successive number or groups of reading operations, the membrane may be suitably advanced over the rollers 34, 36 either by manual operation or by a mechanism mechanically connected for intermittent operation upon motion of the table 46.

The modulated reflection is received by the surface of photosensitive device 30 as an image of the pattern of impressed optical contact of the film 32, being darkened in such pattern. The photosensitive surface 30 may simply be a viewing screen or, for electronic processing, an array of photocells or the like arranged to be electrically scanned and processed according to known techniques. A specific and simplified electrical scan and processing system is described below in connection with a preferred embodiment of the invention.

In the phenomenon of total internal reflection, the frustration of certain portions of such reflection as by changing the medium or the index of refraction at the interface in a significant pattern or in a selected pattern, allows a diffuse reflection from the interface at and over the area of such pattern. Accordingly, in viewing the reflecting surface from any point within a critical angle cone, a cone that has an axis normal to the reflecting surface and has all of the surface elements thereof lying along the critical angle, none of the totally internally reflected light is received. Nevertheless, there is received the diffusely reflected light. Accordingly, in the apparatus described in FIG. 1, if an operator were positioned to view the reflecting surface 14 from a point within the critical angle cone, that is, at some point above the surface in this drawing, he sees a positive image of the embossed character that is impressed upon the film 32. He sees diffuse reflections from portions of surface 14 that are optically contacted by film 32. Accordingly, a clear positive image of the embossed character being read may be displayed upon a transparent screen (not shown) positioned immediately above the body 10 and, at the same time, the negative image will be received by the photocell array 30. It will be appreciated that the positive image due to diffuse reflection is considerably less bright than the image formed by the total internal reflection since the latter is of greatly increased efficiency. Nevertheless, the contrast afforded by the positive image of diffuse reflection is of more than sufficient brightness to be readily visible to the operator's eye.

Opacity or translucency of the film 32 has substantially negligible effect upon the operation of the optical reader to the extent that it depends on frustration of total internal reflection, since total internal reflection is frustrated not by opacity, but by variation of the index of refraction. Note that all light that is not totally internally reflected is either absorbed or scattered and will not contribute significantly to the reflected beam that is used for reading.

In practice of this invention it is most convenient to employ electromagnetic energy in the band of visible wavelengths. Nevertheless, energy of other wavelengths may be employed both in infrared and ultraviolet regions and beyond. Accordingly, the term optical as used herein is deemed to include such infrared and ultraviolet energy wavelengths.

It will be readily appreciated that a variety of different types of topological surface features may be employed to modulate the reflection according to concepts of this invention. Such features include embossed printing, patterned depressions, or a pattern of holes. Nevertheless, the present concept will find greatest utility for reading topology that is not readily read by other systems.

Illustrated in FIGS. 2, 3, 4, and 5 is a preferred mechanization of principles of the present invention, arranged to modulate total internal reflection of a light beam in accordance with a sequential variation of topological patterns which, in this arrangement comprises a line of topological surface features such as a line of embossed printing upon a conventional credit card. The arrangement of FIGS. 2 through 5 includes a hollow base structure 56 providing a substantially flat upper surface or table 58 and carrying an upper housing 60 which is preferably removably mounted for access to the components mounted therein. Extending across the upper housing 60 are first and second structural plates or members 62, 64 upon which are suitably mounted various operating components of the arrangement that are carried above the table 58. A pair of fixed brackets 66, 68 are apertured to receive a removable axle or pin 70 which is held in place by means of a resilient detent 72 affixed to structural member 62. Rotatably mounted on the axle 70 is a thin cylinder or disc 74 preferably made of an acrylic resin or plastic such as Lucite or Plexiglas. Glass or other hard, rigid, optically transparent material having an index of refraction considerably above the index of refraction of air may be employed for the disc 74. The lower edge of the disc 74 extends through an aperture in the support plate 64 to a point slightly above the surface of the table 58 as will be more particularly described below. A light source 76 is mounted adjacent the lower half of the disc to direct light through a diffuser such as a frosted window 78 at a downwardly directed angle through the sides of the disc to evenly illuminate and to be reflected from the annular internal peripheral surface 80 of the disc. There is little difficulty in causing light to impinge upon the internal annular disc surface at an angle greater than the critical angle, since refraction of the light in entering through the disc side is in such a direction as to displace the axis of light propagation toward a normal to the surface through which the light enters the disc. Accordingly, for materials such as glass or acrylic resin, having an index of refraction of about 1.5, most of the light entering through the side of the disc will impinge upon the internal annular peripheral surface 80 thereof at an angle greater than the critical angle of the material. Light reflected from surface 80 is collected by a lens system 82, reflected from a mirror 85 carried in housing 60 and, thence, transmitted through an aperture in support plate 62 to a light receiver comprising an array of photosensitive cells 84.

A thin film or membrane such as a plastic tape of polyvinyl chloride, polyethylene or rubber having a thickness in the range of 5 to 20 mils, preferably about 12 mils, is formed in a continuous strip and entrained over the periphery of disc 74 and also over the periphery of a tape idler roller 88. Tape roller 88 in the illustrated embodiment has a fixed axle removably mounted in a slot formed in a rigid bracket 90 whereby the roller 88 may be readily removed to allow removal and replacement of tape 86.

Rotatably mounted in the base 56 is a drive roller 92 having a resilient rubber rim 94. Also carried in the base 56 is a low speed gear motor 96 that is arranged to drive the roller 92 by means of a friction wheel drive 98. The resilient rim 94 of the drive roller protrudes through an aperture in the table 58 in close proximity to the lowermost edge of the optical disc 74 at a distance in the order of the thickness of the card. The arrangement is such that a conventional credit card 100, placed on the upper surface of table 58 and initially positioned with an edge in contact with the rubber rim 94 on the one side and with the plastic film 86 on the other side, will be drawn between the disc and the rotating drive roller and concomitantly firmly pressed upwardly against the film as the card 100 is drawn between the rotating disc and roller. A guide frame 102 having a pair of guide bars 104, 106, (FIG. 4) rigidly interconnected by guide retainers 108, 110, is formed with a width between its guide bars sufficient to snugly receive the standard size card that is to be read. Guide frame 102 is mounted for lateral adjustment along the direction of the axis of rotation of disc 74 so as to appropriately position a line of embossed characters 112 (FIG. 4) for motion along and in contact with the periphery of disc 74 as the card moves and is drawn along the surface of the table between the drive roller and film. The guide is laterally positioned with respect to the disc by means of a plurality of slots formed in the upper surface of guide retainer 110 which cooperate with one or more spring-pressed detents 114 carried in a fixedly mounted adjustment bar 116.

Figure 2:
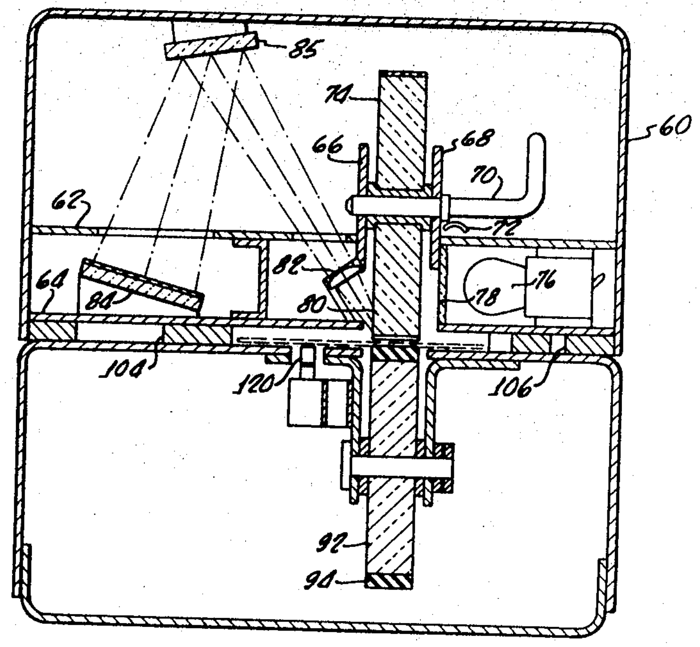

In order to start and stop the motor 96 and other electronics to be described hereinafter, there is mounted to and within the base 56, a start/stop switch 118 carrying a resilient switch-operating finger 120 that normally protrudes slightly above the level of table 58 at the side of the drive roller 92 (FIG. 2).

The conventional credit card 100 is made of a rigid plastic having one or more lines of symbols or characters embossed thereon. These characters generally are raised from the remainder of the surface of the card a distance of approximately 0.015 inch. For electronic information retrieval, it is most commonly required that the identification number appearing on the card be transduced into a pattern of electrical signals and then fed to a computing or other data-handling device that is capable of accepting and operating upon such a pattern of electrical signals. Accordingly, the credit card will be placed on the upper surface of table 58, raised letters projecting toward the disc, between the guide bars 104 and 106. The guide 102 is laterally adjusted as by release of the detents 114 so as to align the row of identification characters 112 with or between the lateral surface boundaries of the disc 74. The line of characters to be read need not be exactly centered under the disc since the reading will occur over the entire width of the disc's annular periphery. Nevertheless, the number and position of the adjustable detents and recesses are determined to best accept and position a variety of different types of cards to enable reading of lines of characters having different lateral positions on the card. As the edge of the card is initially inserted between the rubber rim 94 of the drive roller and the disc 74, switch operator 120 is depressed by the edge of the card and the motor 96 starts to rotate drive wheel 92. The card is thereby drawn between the drive wheel and the film 86 on the disc, compressing the rubber rim 94 and firmly pressing the card against the plastic film 86. The entire length of the card is thus drawn across the periphery of the disc 84 with the resilient thin film therebetween and the film 86 is moved together with the card, rotating with the disc 74 over the tape roller 88.

As previously described, plastic tape 86 is not maintained out of physical contact with the smoothly ground optical surface of disc 74 since usual surface irregularities of the film, or a film of trapped air, or both, will tend to prevent the film 86 from frustrating total internal reflection within the disc 74. In fact, it has been found that with an arrangement such as that illustrated in FIG. 3, tension applied to the plastic tape by the roller 88 will not begin to affect the total internal reflection until the tension reaches a magnitude considerably beyond that necessary to insure frictional connection of the tape and the external disc surface. Thus, as the card 100 passes over the periphery of the disc the embossed characters will sequentially and selectively press the film 86 against the periphery of the optical surface of the disc 74, exerting pressure in a direction substantially radially of the disc. Substantially throughout all such areas of direct radial pressure, the film is caused to make optical contact with the disc to thereby frustrate total internal reflection from those portions of the surface 80 over which such optical contact is made. The distance of interest in this arrangement, namely the distance between the optical surface of the disc and the surface of the plastic tape 86 is quite small, on the order of one or several wavelengths of the light of interest when total internal reflection will take place. In other words, unless and until the distance between the film 86 and the external optical surface of disc 74 is in the order of 1 wavelength or less of the impinging light, little or no frustration of the total reflection will occur. When optical contact is made, the film is not spaced from the disc by more than a distance in the order of 1 wavelength or less. Nevertheless, the tape roller 88 is required since there may be some tendency for the film to stick to the disc surface after it has been pressed against the surface. Accordingly, the tape roller 88 ensures that the film is removed from optical contact with the disc before it is once again placed in position to read the pattern on the card.

Figure 6:
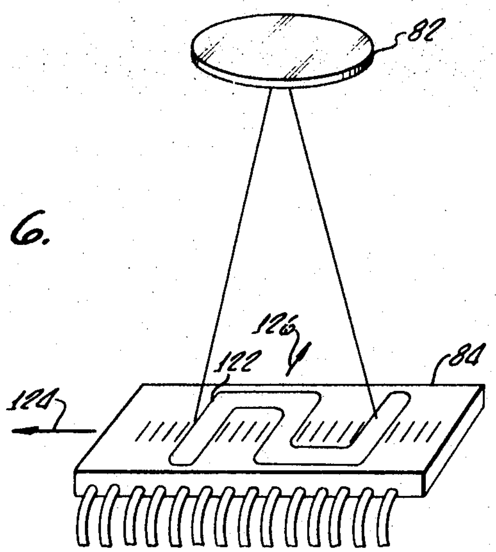
FIG. 6 illustrates a photocell array of the apparatus shown in FIGS. 2 through 5.

The total internal reflection from the surface 80 is focused by a lens 82, and reflected from mirror 85 to fall upon the surface of the photosensitive array 84. FIG. 6 indicates schematically the light coming through the lens 82, omitting showing of the mirror 85, and illustrates the array as comprising a linear group of photocells D. The array of photocells most conveniently is a readily available strip of silicon photodiodes that need have relatively low sensitivity and are made in lineal strips of 10 or more elements each. Such diodes are manufactured in large quantities for photo-optical reading of punched paper tape and, accordingly, are of low sensitivity because they are normally subjected to light of relatively high intensity. The elements thus are relatively inexpensive, widely available and may be employed in the apparatus of the present invention because use of total internal reflection provides an image of high optical intensity.

Illustrated in FIG. 6 is the reflected image of a single character impressed by a credit card upon the plastic film 86. It may be seen that the lineal array of photodiodes 84 substantially spans a vertical slice of the reflected character. Note that the character is formed in the image as the absence or lower intensity of light because it is formed by the frustration of the reflection over the pattern of optical contact of the plastic tape 86 upon the surface 80. Thus the image of the raised character on the card being read is presented to the photocell array as a dark region 122 on a bright background. The length of the photocell array along the direction of the arrow 124 is greater than the total height of the character image so as to allow for misregistration of the position of the character or, more directly, to allow for misregistration of the line of characters on the card with respect to the optical disc 74. The total width of the disc may be in the order of twice the height of a character being read whereby a significant amount of misregistration can be tolerated at the disc periphery. For reading numbers produced with one of the standard OCR fonts, the character image 122 impinging upon the photocell array 84 would cover, for example, some 13 photodiodes of a total array of 24, thereby allowing for an 85 percent misregistration. The image of the character 122 is magnified to an extent determined by the magnification of the lens 82 and the total length of the light path from the lens to the photocell array. Some demagnification also occurs due to the refraction of the light in traversing the glass-air interface at the sides of the disc. In an exemplary embodiment, amplification due to the lens is about 8 and amplification due to refraction by the disc is about 0.35 whereby the total amplification is about 2.8.

As the motor 96 turns, the card is progressively fed into the reading apparatus, the disc 74 turns and different portions of each character are sequentially pressed against the film. Therefore, each character such as the character 122 has its image traverse the array of photocells in the direction indicated by arrow 126 (FIG. 6). During one full traverse of a single character, the entire array of photocells will have the outputs thereof sampled a number of times whereby, in effect, a number of successively displaced vertical slices of the character are obtained. For OCR font numbers, eight sets of samples for each character are adequate to insure reliable recognition. With normal spacing between characters, at least two samples or two complete vertical scans of the photocell array will be made in the blank area between characters, thereby allowing the end of a character to be identified by the two or more successive scans of showing all photocells of a line in full illumination.

Figure 7:
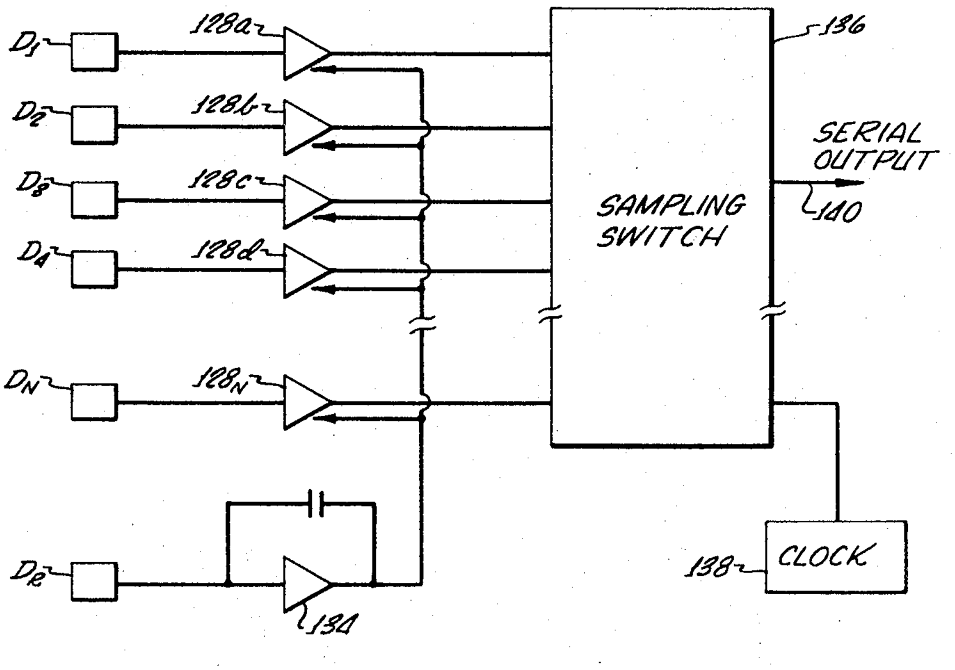
FIG. 7 illustrates electronics for scanning the photocell array of FIG. 6, FIGS. 8 and 9 are two views of a modified form of the arrangement of the FIGS. 2 through 5, FIGS. 10 and 11 are two views of still another modified arrangement of the apparatus of FIGS. 2 through 5.

The photocells are scanned vertically in the direction of the arrow 124 of FIG. 6 by a multiplexing arrangement, details of which are shown in FIG. 7. As illustrated in this figure, each of a linearly arranged array of photodiodes $D_1$ through $D_N$ has the output thereof fed to an individual one of a group of threshold of amplifiers 128*a* through 128*n*, respectively. A reference photocell $D_R$ is suitably positioned to receive light reflected from the surface 80 at a portion not generally subjected to frustration of total internal reflection. The output of the reference cell is fed through an integrating amplifier 134 which provides a control signal to each of threshold amplifiers 128*a* through 128*n* to establish a threshold value thereof. These amplifiers will provide an output signal only when the input signal thereto from the respective photo diodes is greater than the amplifier threshold established by means of the reference cell and integrating amplifier. Accordingly, the output of each of the threshold amplifiers is, logically, a binary 1 or binary zero depending on whether the cell is in a dark or bright region of the photocell array. Reference cell $D_R$ may be positioned at one extremity of the photocell array or it may be suitably positioned at any point within the upper housing 60 where it will receive general illumination from light reflected from surface 80. Alternatively, the signal provided by the reference cell may be generated by an averaging of the outputs of all of the operating cells of the array.

The outputs of the array of cells, at the outputs of the threshold amplifiers, are time multiplexed in a sampling switch 136 that is triggered for each sample by a signal from a clock generator 138 to provide on output line 140 a chronological sequence of high or low (one or zero) signals representing the illumination received by the respective photocells. Preferably the signal from the clock generator 138 is caused to switch the multiplexer from one photocell to the next. In order to obtain the proper number of full sets of samples for each character, the clock generator 138 is referenced from the drive motor so that the sampling speed is synchronized with the speed at which the card is fed into and through the reader.

It is contemplated that the apparatus may be operated by hand, without a motor drive, whereby the clock reference signal would be generated by conventional apparatus that is synchronized from or driven by rotation of the disc 74 itself. In such a situation, an additional photocell may be employed to detect timing marks on the extreme edge of the periphery of the cylinder 74 or a suitable shaft position encoder may be connected to the axle of the disc 74 to provide the desired synchronization of the photodiode scanning with the transverse motion of the card 100.

Consider, for example, the motor 96 as being arranged to move the card 100 at a rate of 3.375 inches per second through the reader, a rate that requires 1 full second for a standard credit card to entirely traverse the disc 74. Typical characters are 0.1 inch wide, whereby the image of such a character traverses the photocell array 84 in the direction of arrow 126 in 30 milliseconds. In order to meet the exemplary requirement of eight vertical sets of samples for each character, the time for each complete sample period is 3.75 milliseconds, whereby the clock period for an array of 24 photocells in 156 microseconds. In other words, in this example, each photocell would have its output sampled by the multiplexer 136 for a duration of 156 microseconds.

The serial output on line 140 of multiplexer 136 comprises a digital signal, a series of pulses, that represents the characters, such as character 122, that are formed on the embossed card. Character words e.g., groups of serial pulses collectively representing a single character) are separated by $2n$ zeros (where $n$ is the total number of photocells in an array and zero represents light of high intensity) that identify the blank spaces between the characters. If the photocell array extends for the complete height of the character image, the output signal is independent of image position. Misregistration of the character with respect to the photocell array merely effects a relatively small amount of time shifting of the total character word as a unit, but in no way adversely affects the information presented.

Processing of the signal provided at the output of multiplexer 136 may be performed by a number of well-known logical techniques as by, for example, use of a computer employing existing character recognition algorithms to generate one of the standard digital codes for alphanumeric characters. Alternatively, recognition and conversion of the serial output of the multiplexer could readily be accomplished by a fixed processor located at or forming a part of the optical reader itself. Such local recognition and coding would provide a compacted output data. It will be readily appreciated that the described vertical sampling of slices of the character image as it traverses the photocell array provides for a simplified and inexpensive encoding of the character image. Nevertheless, a variety of different types of optical image encoding systems are available and well known, including systems of the several patents identified above. Other schemes for electrically encoding optical character images are shown and described in detail in the aforementioned patents to Buell, Lasky, and Abbott, Jr., et al.

Figure 8:
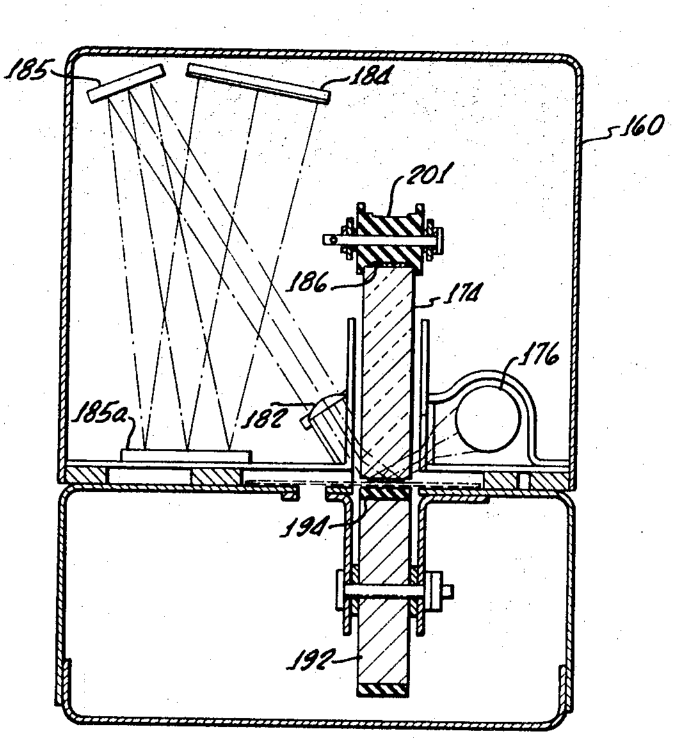
Figure 9:
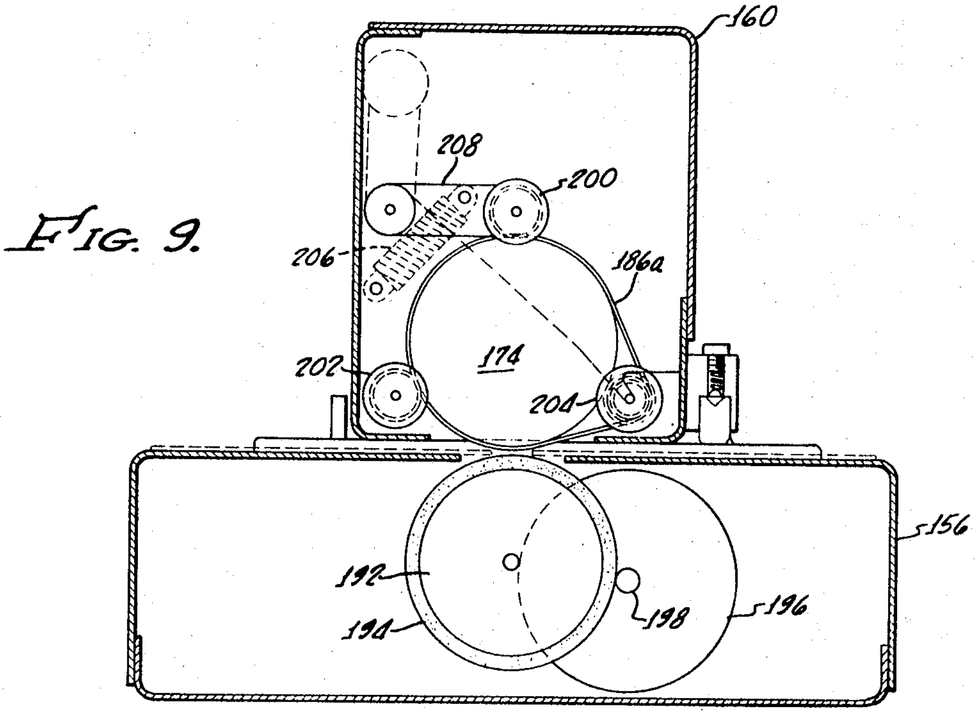

In order to increase the area available for transmission of light into the disc 74, the reader structure of FIGS. 2 through 5 is modified as illustrated in FIGS. 8 and 9 wherein parts equivalent to like parts of the embodiment of FIGS. 2 through 5 are designated by the same reference numerals having the prefix numeral 1. Accordingly, in the arrangement of FIGS. 8 and 9, the optical reader includes a base 156 and upper housing 160, optical disc 174, drive wheel 192 and rim 194 driven by a motor 196 and friction wheel 198, light source 176a, and mirrors 185, 185a directing the total internal reflection to a photocell array 184. All of the elements described are identical to the corresponding elements of the embodiment of FIGS. 2 through 5 except that the light source 176a may be enlarged somewhat as shown in FIG. 8 since in this embodiment there is no obstructing central axis supporting the disc 174 for rotation. The disc 174 is rotatably carried by three guide rollers 200, 202, and 204 of which roller 200 is pivotally mounted and resiliently urged as by a spring-and-arm arrangement 206, 208, to hold the disc 174 in firm engagement at its periphery with the peripheral surfaces of the guide rollers. The guide rollers have the surfaces thereof rebated as at 201 to receive the thin resilient film 186a which in this embodiment is made somewhat narrower than the total width of the optical disc 174. The guide roller 204 performs the dual function of providing part of the peripheral support for the optical disc 174 and also supports the resilient thin film 186a at a position removed from the periphery of the optical disc 174. It will be readily seen that this peripheral rotational support of the optical disc 174 allows for an increased area of light transmission to and from the total internal reflecting surface of the disc.

The following mirrors 185, 185a provide an increased length of optical path to thereby enable greater magnification of the negative image received by the photocell array 185. In an arrangement such as that illustrated in FIGS. 8 and 9, lens amplification may be 16 and disc amplification is 0.35 whereby total amplification of 5.6 is available. It will be readily appreciated that the light source 176 may be positioned at a variety of locations within or external to the housing 160 and the light therefrom suitably directed to and within the disc 174 by means of an appropriate optical system.

Figure 3:
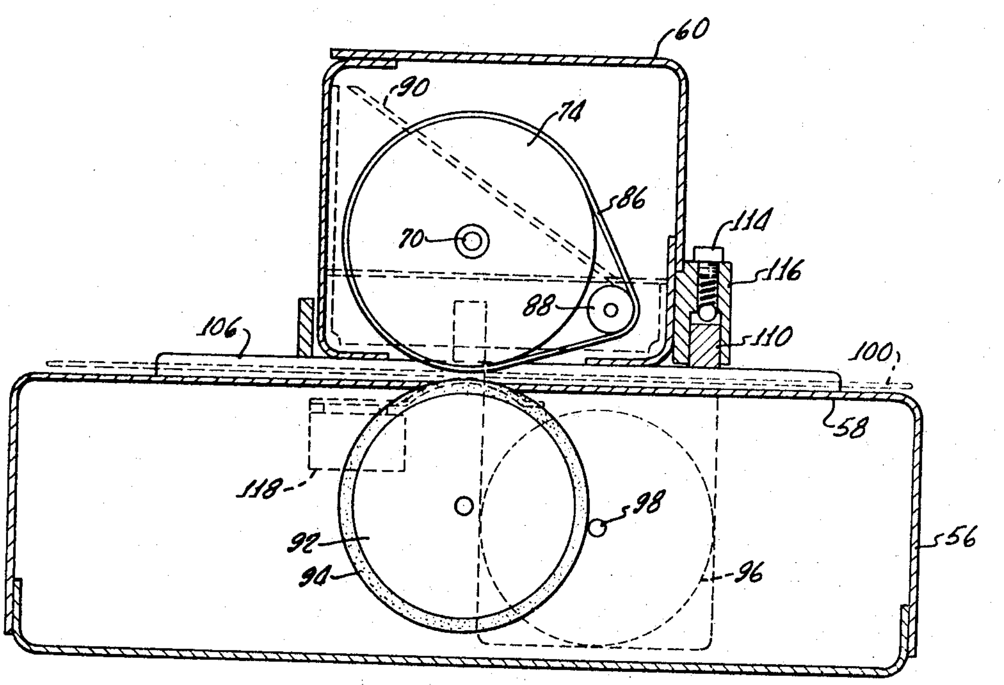
Figure 4:
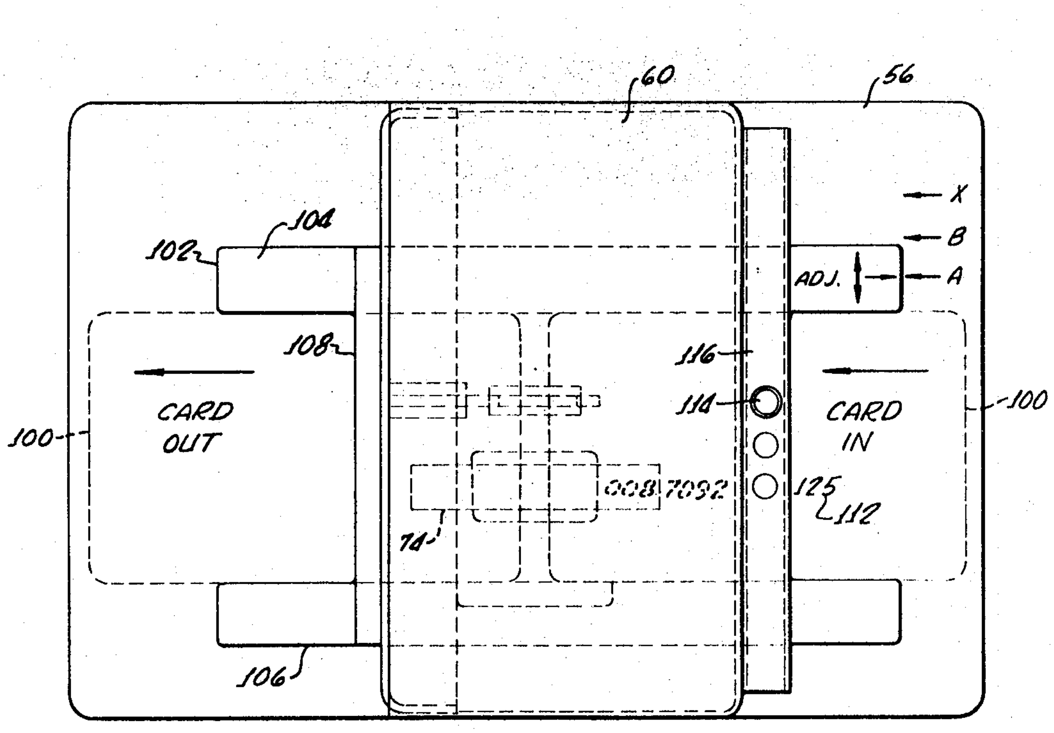
Figure 5:
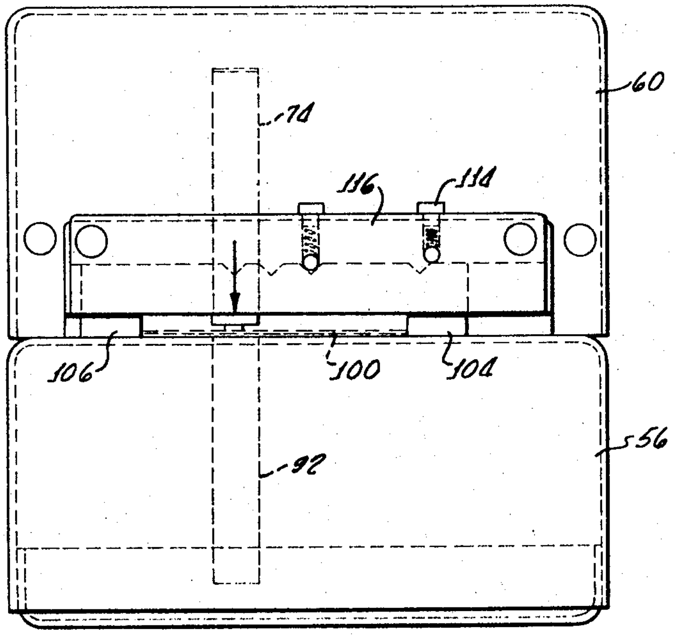
Figure 12:
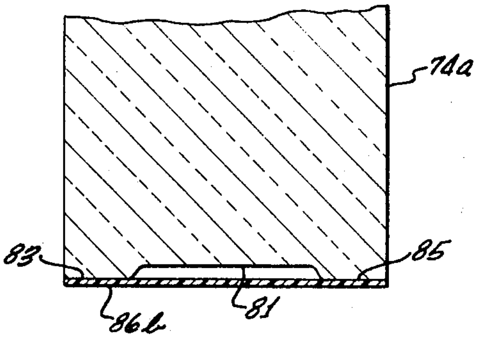
FIG. 12 illustrates a modified form of the optical cylinder that may be employed in certain of the illustrated embodiments.

As previously indicated, the tape rollers 88 and 204 of FIGS. 3 and 9, respectively, are provided to prevent the film from adhering to the optical surface of the disc 174 after it has been pressed into optical contact therewith. For an arrangement wherein the film is permanently attached to the outer surface of the optical body or where the film is not moved across the surface of the optical body as it is in the structures of FIGS. 1, 3 and 9, the totally internally reflecting surface 81 is rebated as shown in FIG. 12 and the optical or thin film 86 b is fixed to or mounted to be permanently in contact with shoulders 83, 85 of the optical body 74a. The film is spaced from the totally internal reflecting surface 81 by a relatively small distance, in the order of several wavelengths of the light employed in the apparatus. In such an arrangement, the embossed characters to be read are pressed against the film 86b, causing it to make optical contact with the depressed or rebated surface 81, but elasticity of the membrane lifts the film from its contact with the surface 81 when pressure of the embossed character is removed.

Figure 10:
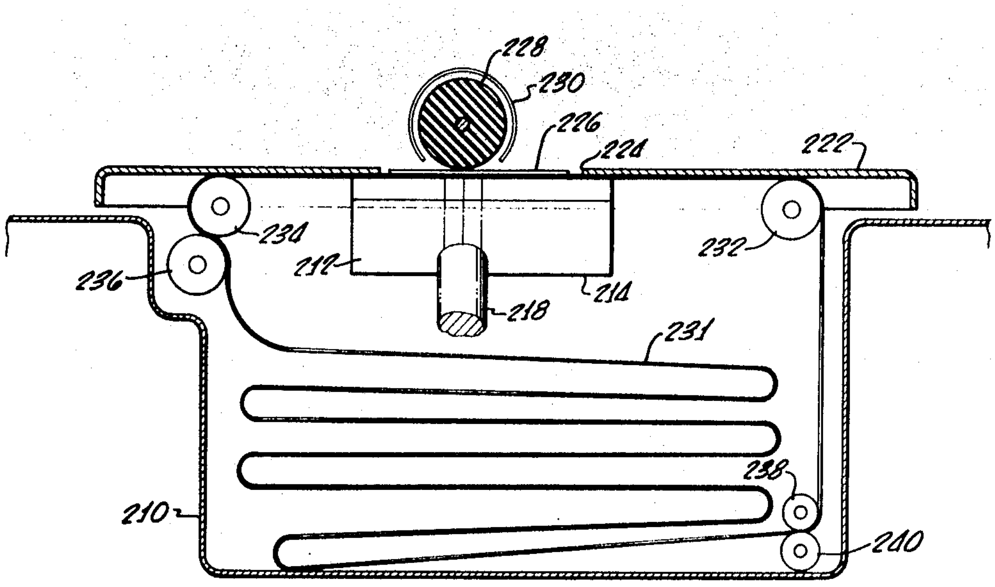
Figure 11:
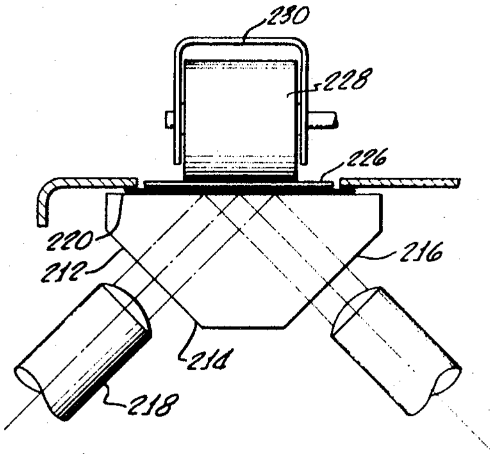

Illustrated in FIGS. 10 and 11 is an arrangement wherein substantially all of the operating mechanisms, including optics and electronics, is mounted below the card-carrying table with only a drive roller mounted above the table. In this arrangement, a housing 210 carries at its upper portion a fixedly mounted body 212 of suitable optical material. The body 212 has first and second angulated surfaces 214, 216 to allow light from a source 218 to impinge upon a totally internally reflecting surface 220 of the body at an angle greater than the critical angle thereof. Light totally reflected from the surface 220 is passed through the angulated body surface 216 for collection by an optical-sensitive device or array of photocells for reading by optical pattern readers that may be of the type described in the patents referred to above. A carriage 222 is mounted for traverse across the table in a plane parallel with the surface 220 of optical body 212 and is formed with a depression 224 for receiving a credit card 226 bearing embossed characters. As the carriage with the card 226 therein moves across the optical surface of the optical body 212, it passes under a compression roller 228 rotatably mounted in a housing 230 carried by the housing 210 and the card is thereby pressed downwardly against the optical body. As previously indicated, the compression roller may have a resilient or a rubber rim to assist in the compression of the card and to allow for irregularities in the card surface.

In the arrangement of FIGS. 10 and 11 a thin film 231 is arranged to be pressed into optical contact with the surface 220 of optical body 212 by the downwardly protruding embossed characters on the card. Film 231 is carried over a pair of rollers 232 and 234, extending therebetween and between the upper surface of the optical body 212 and the undersurface of the carriage 222, whereby it is interposed between the credit card characters and the totally internal reflecting surface. The film or tape 231 is drawn across the optical surface by means of a drive roller 236 and is stored in folds within the bottom portion of housing 210. The bottommost fold of the tape may be withdrawn through rollers 238, 240, for passage once again over the roller 232. In such an arrangement, the tape is preferably formed in a single endless loop and is moved across the optical surface together with carriage motion so as to present fresh tape portions to the embossed character being read. The tape may be periodically moved by manual operation or the tape drive rollers may be mechanically connected for intermittent operation whenever the carriage 222 is operated.

Angulation of the sides 214 and 216 of the optical body, which preferably is in the order of 45°, is required by reason of the refractive characteristics of glass. Optimumly, the body 212 would be a relatively thin optical slab having a lower surface most conveniently made parallel to the reflecting surface 220. However, if such lower surface were parallel to the reflecting surface, any light coming into the body from a point below the lower surface of the body is refracted in a sense to decrease its angle with a normal to such surface. Accordingly, it is difficult, if not a practical impossibility to cause such light to impinge upon the reflecting surface 220 at an angle greater than the critical angle. For this reason, the body 212 is formed with surfaces 218 and 216 angulated at about 45°, whereby refraction does not prevent the light from being directed at the surface 220 at an angle greater than the critical angle of the optical body.

The patent to McCutchen, 3,407,715 describes still other optical arrangements that may be employed in the practice of this invention to facilitate direction of light to and from a totally internally reflecting surface.

Certain types of mechanisms commonly used for imprinting credit card information upon sales slips employ an open-top table having a recess for receiving the credit card and a traversing pressure bar that is manually moved across the card, sequentially pressing the inked or carboned sales slip against different portions of the embossed card characters during the pressure bar traverse. Such a traversing pressure bar and fixed card-receivng table may be employed to replace the pressure roller and carriage of the apparatus of FIGS. 10 and 11. Such an arrangement would employ sequential scanning electronics of the type described in connection with FIG. 7.

The particular configurations of optical body employed for total internal reflection in the arrangement of FIGS. 10 and 11 is readily adaptable for viewing of the diffusely reflected positive (bright characters on dark background) image described in detail in connection with the embodiment of FIG. 1. Accordingly, conventional mirror-and-lens systems may be employed to display the positive diffuse reflection simultaneously with the presentation of frustrated total internal reflection for transduction into electrical signals.

There have been described improved methods and devices for reading topological patterns such as embossed characters or patterns of depressions or holes in a surface that provide for a unique mode of frustration of total internal reflection. The use of a thin elastic film interposed between the topological pattern to be read and the totally reflecting surface facilitates the reading of a variety of types of devices without any kind of special preparation of the devices and without requiring use of such force as to destroy the pattern that is being read or causing serious wear of the pattern in repeated readings.

The foregoing detailed description is to be clearly understood as given by way of illustration and example only, the spirit and scope of this invention being limited solely by the appended claims.

We claim:

1. A topological pattern reader comprising
a rotatably mounted optically transparent disc,
means for projecting light through at least a part of the disc to impinge upon the interior of a peripheral annular surface of the disc at an angle greater than the critical angle,
a thin flexible elastic strip entrained over at least part of the periphery of the disc and in close proximity to but normally out of optical contact with the periphery of the disc, and
means for impressing a topological pattern to be read against said film at said disc, whereby the film is pressed into optical contact with the periphery of the disc in at least a portion of said topological pattern.

2. The reader of claim 1 wherein said last-mentioned means comprises
a support table for carrying a sheet bearing said topological pattern, said support table having an aperture therein closely adjacent said disc at the periphery thereof,
a drive roller mounted to said support table and having a peripheral portion extending through said table aperture for contacting a sheet carried thereby,
said peripheral sheet-contacting portion of the drive roller being spaced from the film by a distance sufficient to effect frictional engagement of said sheet between the roller and disc, and
means for rotating said drive roller, whereby said sheet having a topological pattern thereon is drawn between the disc and the drive roller with the thin film interposed between the sheet and disc, and the pattern on the sheet is impressed against the film at its contact with the disc as the drive roller and disc rotate.

3. The reader of claim 1 including
means for displacing said film from said surface upon release of the pressure of said topological pattern.

4. The reader of claim 1 wherein said pattern is a sequentially varying topological pattern.

5. The reader of claim 1 wherein said pattern is a spatially distributed pattern of varying pressure.

6. The reader of claim 1 wherein said pattern is a sequence of characters protruding from the surface of a relatively rigid material.

7. A topological pattern reader comprising
a body of electromagnetic energy-transmitting material having a reflecting surface from which electromagnetic wave energy may be totally reflected, a thin pliant film closely adjacent said surface, and forcing means mounted adjacent said film for pressing a topological pattern bearing member against said film, whereby the film is pressed by the topological pattern of said member against the surface of the body to frustrate total internal reflection of energy from said surface in a pattern conforming to at least a portion of the topological pattern of said member, said body comprises a rotatably mounted optical cylinder.

8. The reader of claim 7 including
first image receiving means for receiving energy totally reflected from said surface, and
second image-receiving means for receiving energy diffusely reflected from said surface.

9. The reader of claim 7 including
a film guide spaced from said cylinder, said film being entrained over said cylinder and over said guide, whereby the portion of said film entrained over said guide is displaced from said body.

10. The pattern reader of claim 9 including
a linear array of photosensitive devices for receiving light totally internally reflected from said internal surface of the cylinder and modulated by said topological pattern, said array of devices being oriented along a line that is substantially angulated with respect to the direction of traverse of the image of said pattern across said array,
a plurality of threshold amplifiers each having an input respectively connected to an individual one of said photosensitive devices,
a reference photosensitive device positioned to receive light reflected from said internally reflecting surface,
means responsive to the reference device for controlling the threshold level of each of said amplifiers,
means for selectively sampling the output of each of said threshold amplifiers, and
means synchronized with rotation of said cylinder for switching said sampling device from one of the threshold amplifiers to a next one of the threshold amplifiers.

11. The pattern reader of claim 7 including
an energy-collecting surface positioned to receive an image of said pattern formed by frustrated total reflection from said surface,
said image traversing said collecting surface as said cylinder rotates,
said collecting surface comprising
a linear array of photosensitive devices extending in a line substantially transverse to the direction of said image traverse, and
means synchronized with rotation of the cylinder for scanning said linear array of devices.

12. The pattern reader of claim 7 wherein said body comprises
an optically transparent material that has at least one surface thereof angulated with respect to said reflecting surface, and
means for directing a beam of light into said body through said angulated surface at an angle to impinge upon said reflecting surface at an angle greater than the critical angle thereof.

13. The pattern reader of claim 12 wherein said angulated surface forms an angle of less than 90° with respect to said reflecting surface.

14. The pattern reader of claim 13 wherein said body has a second angulated surface symmetrically disposed with respect to said first-mentioned angulated surface, and including
optical receiving means for receiving light reflected from said internal reflecting surface through said second angulated surface of said body.

15. The pattern reader of claim 7 including
means for impinging a beam of light upon said internal reflecting surface at an angle greater than the critical angle,
means for receiving light reflected from said internal reflecting surface at an angle greater than the critical angle, and
means for receiving light diffusely reflected from said internal reflecting surface, said last-mentioned means comprising
means positioned to receive light reflected from said surface at an angle less than the critical angle.

16. The pattern reader of claim 7 including
an adjustable guide for receiving said topological pattern bearing member, said pattern comprising
at least one line of characters,
means for laterally adjusting said guide to position a selected line of topological characters of said member in alignment with the periphery of said cylinder, said forcing means comprising a driving wheel having a resilient rim positioned in close proximity to the thin film, and a tape idler roller, said thin film comprising
an endless strip entrained over the periphery of said cylinder and over the periphery of said idler roller, whereby as said cylinder and endless tape rotate, the tape traverses said idler roller and is temporarily displaced from contact with the peripheral surface of the cylinder.

17. The pattern reader of claim 16 including three rotatably mounted idler rollers each having peripheral contact with the periphery of said cylinder to collectively provide rotatable support thereof, one of said idler rollers comprising said idler tape roller.

* * * * *